United States Patent
Yamamoto et al.

(10) Patent No.: US 8,616,025 B2
(45) Date of Patent: Dec. 31, 2013

(54) METHOD OF MANUFACTURING GLASS, AND STIRRING DEVICE

(75) Inventors: Kohei Yamamoto, Sayama (JP); Hitoshi Gekko, Yokkaichi (JP)

(73) Assignee: AvanStrate Inc., Mie (JP)

( * ) Notice: Subject to any disclaimer, the term of this patent is extended or adjusted under 35 U.S.C. 154(b) by 0 days.

(21) Appl. No.: 13/610,774

(22) Filed: Sep. 11, 2012

(65) Prior Publication Data

US 2013/0125591 A1    May 23, 2013

Related U.S. Application Data

(63) Continuation of application No. PCT/JP2011/076736, filed on Nov. 18, 2011.

(51) Int. Cl.
*C03B 5/187* (2006.01)

(52) U.S. Cl.
USPC ....... 65/135.3; 65/134.1; 65/134.9; 65/135.2; 65/178

(58) Field of Classification Search
USPC ................ 65/134.1, 134.9, 135.2, 135.3, 178
See application file for complete search history.

(56) References Cited

U.S. PATENT DOCUMENTS

| | | | |
|---|---|---|---|
| 2,569,549 A | 10/1951 | Barrick | |
| 2,831,664 A | 4/1958 | Spremulli | |
| 3,419,373 A | 12/1968 | Gould et al. | |
| 5,340,372 A | 8/1994 | Macedo et al. | |
| 2003/0101750 A1 | 6/2003 | Goller et al. | |
| 2008/0041109 A1* | 2/2008 | Burdette et al. | 65/135.2 |
| 2009/0025428 A1* | 1/2009 | Naumann et al. | 65/135.3 |
| 2009/0282872 A1 | 11/2009 | Tomamoto et al. | |
| 2011/0032791 A1 | 2/2011 | Singer | |
| 2012/0180529 A1 | 7/2012 | Singer | |

FOREIGN PATENT DOCUMENTS

| | | |
|---|---|---|
| JP | 61-21923 A | 1/1986 |
| JP | 10-265226 A | 10/1998 |
| JP | 2001-72426 A | 3/2001 |
| JP | 2003-252631 A | 9/2003 |
| JP | 2005-511462 A | 4/2005 |
| JP | 2006-62903 A | 3/2006 |
| JP | 2007-204355 A | 8/2007 |
| JP | 2007204357 A | 8/2007 |
| JP | 2011-516381 A | 5/2011 |
| WO | 2011/020625 A1 | 2/2011 |

* cited by examiner

*Primary Examiner* — Queenie Dehghan
(74) *Attorney, Agent, or Firm* — Sughrue Mion, PLLC

(57) ABSTRACT

A method of manufacturing glass comprises a stirring step in which molten glass MG is stirred. The stirring step comprises a first stirring step and a second stirring step. In the first stirring step, the molten glass MG is stirred while being directed upward from below in a first stirred tank 100a. In the second stirring step, the molten glass MG stirred in the first stirring step is stirred while being directed downward from above in a second stirred tank 100b. The first stirred tank 100a has a first discharge pipe 110a capable of discharging the molten glass MG from the bottom of a first chamber 101a. The second stirred tank 100b has a second discharge pipe 110b capable of discharging the molten glass MG from the liquid level LL of the molten glass MG in a second chamber 101b.

19 Claims, 8 Drawing Sheets

METHOD OF MANUFACTURING GLASS, AND STIRRING DEVICE

TECHNICAL FIELD

This is a Continuation of Application No. PCT/JP2011/076736 filed Nov. 18, 2011, the contents of all of which are incorporated herein by reference in their entirety.

The present invention relates to a method of manufacturing glass, and to a stirring device.

BACKGROUND ART

In processes for high-volume production of glass articles such as plate glass, a glass material is heated to produce molten glass, and the molten glass so produced is molded to manufacture glass articles such as plate glass. If the molten glass is heterogeneous, striae may form in the glass articles.

Striae are zones of striated appearance differing in refractive index and/or specific gravity from the surrounding area; in optical components such as lenses, substrates for liquid crystal displays (LCD), and other such applications, there is a need to rigorously eliminate them from the glass articles. Stirring of the molten glass by a stirring device is performed in order to prevent striae. A typical stirring device is provided with a chamber of round cylindrical shape, and a stirrer. The stirrer has a shaft serving as a rotation axis, and blades connected to the side wall of the shaft. In the stirring device, molten glass is supplied into a chamber in which the stirrer is disposed, and the molten glass is stirred by axially rotating blades, rendering the molten glass homogeneous.

Patent Document 1 (Japanese Unexamined Patent Application Publication 2001-72426) discloses a stirring device for molten glass, provided with a stirrer having a shaft serving as a rotation axis, and blades connected to the side wall of the shaft. In this stirring device, because the stirrer is arranged in a state in which some of the blades are in proximity to the inner wall of the stirred tank, the molten glass can be homogeneously stirred.

Patent Document 2 (Japanese Unexamined Patent Application Publication 2007-204357) discloses a stirring device for molten glass, in which higher stirring effect can be achieved by connecting a plurality of stirring devices.

SUMMARY OF THE INVENTION

Technical Problem

Various stirring devices have been proposed in the prior art, with the object of stirring molten glass. However, these prior art stirring devices lack sufficient capability to homogenize molten glass in a stable manner. Therefore, there exists a need for a stirring device that can homogenize in a more stable manner molten glass that is supplied to a glass molding step.

With the foregoing in view, an object of the present invention is to provide a method of manufacturing glass and a stirring device, whereby molten glass can be stirred in a more homogeneous manner.

Solution to Problem

A method of manufacturing glass according to the present invention comprises: a melting step for melting a glass material and obtaining molten glass; a stirring step for stirring the molten glass obtained in the melting step; and a molding step for molding glass from the molten glass stirred in the stirring step. The stirring step comprises a first stirring step and a second stirring step. In the first stirring step, the molten glass is stirred while being directed upward from below in the interior of a first stirred tank. In the second stirring step, the molten glass stirred in the first stirring step is stirred while being directed downward from above in the interior of a second stirred tank. The first stirred tank comprises a first chamber, a first stirrer for stirring the molten glass in the first chamber, and a first discharge pipe capable of discharging the molten glass from the bottom of the first chamber. The second stirred tank comprises a second chamber, a second stirrer for stirring the molten glass in the second chamber, and a second discharge pipe capable of discharging the molten glass from the liquid level of the molten glass in the second chamber. The upper lateral part of the first stirred tank is connected by a connecting pipe to the upper lateral part of the second stirred tank. The molten glass is transferred from the first stirred tank to the second stirred tank via the connecting pipe.

In the method of manufacturing glass according to the present invention, in the stirring step, the molten glass obtained in the melting step is stirred in the first stirred tank, and thereafter stirred further in the second stirred tank. In the first chamber of the first stirred tank, the molten glass is stirred while being directed upward from below. The molten glass stirred in the first stirred tank is fed to the second stirred tank via the connecting pipe. In the second chamber of the second stirred tank, the molten glass is stirred while being directed downward from above. In the stirring step, components of high specific gravity (zirconia-rich molten glass and the like) included in the molten glass may accumulate at the bottom of the first chamber in some instances. Because the molten glass ascends within the first chamber and is fed to the second chamber, components of high specific gravity having accumulated at the bottom of the first chamber do not readily flow into the second chamber. And the first discharge pipe is attached to the bottom face of the first chamber. Therefore, components of high specific gravity having accumulated at the bottom of the first chamber can be discharged from the first chamber via the discharge pipe. In the first chamber, components of low specific gravity (silica-rich molten glass, and/or tiny bubbles in the molten glass, and the like) included in the molten glass may accumulate in proximity to the liquid level in some instances. Components of low specific gravity within the first chamber are fed, together with the molten glass, to the second chamber via the connecting pipe connecting the first chamber and the second chamber. Specifically, components of low specific gravity included in the molten glass ultimately accumulate in proximity to the liquid level of the molten glass within the second chamber. And the second discharge tube is attached to the second chamber at a heightwise position in proximity to the liquid level. Therefore, the components of low specific gravity having accumulated in proximity to the liquid level of the molten glass can be discharged from the second chamber via the second discharge pipe.

It follows from the above that, in the stirring step of the method for manufacturing glass according to the present invention, components of high specific gravity included in the molten glass can be efficiently eliminated through the first discharge pipe, and components of low specific gravity included in the molten glass can be efficiently eliminated through the second discharge pipe. If components of different specific gravities included in the molten glass accumulate and become concentrated in the stirring step, and are then fed to the molding step, striae can occur in the molded glass. With the method for manufacturing glass according to the present invention, components of different specific gravities included in the molten glass can be readily eliminated, and therefore the molten glass can be stirred homogeneously in the first stirred tank and the second stirred tank, and the occurrence of striae in the glass can be suppressed.

A method of manufacturing glass according to the present invention comprises: a melting step for melting a glass material and obtaining molten glass; a stirring step for stirring the molten glass obtained in the melting step; and a molding step for molding glass from the molten glass stirred in the stirring step. The stirring step comprises a first stirring step and a second stirring step. In the first stirring step, the molten glass is stirred while being directed upward from below in the interior of a first stirred tank. In the second stirring step, the molten glass stirred in the first stirring step is stirred while being directed downward from above in the interior of a second stirred tank. The first stirred tank comprises a first chamber, a first stirrer for stirring the molten glass in the first chamber, and a first discharge pipe capable of discharging the molten glass from the bottom of the first chamber. The second stirred tank comprises a second chamber, a second stirrer for stirring the molten glass in the second chamber, and a second discharge pipe capable of discharging the molten glass from the liquid level of the molten glass in the second chamber. The upper lateral part of the first stirred tank is connected by a connecting pipe to the upper lateral part of the second stirred tank. The molten glass is transferred from the first stirred tank to the second stirred tank via the connecting pipe. In the second stirring step, the second stirrer rotates about a second shaft as the rotation axis, whereby second ancillary plates create, in the molten glass, a flow in the radial direction of the second shaft, and the second ancillary plates positioned between second support plates of second blades disposed in two adjacent tiers create, in the molten glass, a flow in the same direction. In the second stirring step, the second ancillary plates arranged on the upper principal surfaces of the second support plates of the second blade positioned in the uppermost tier create, above the second support plates of the second blade positioned in the uppermost tier, a first flow moving the molten glass from an inner wall of the second chamber towards the second shaft, and create a second flow ascending the molten glass moved by the first flow along a side wall of the second shaft.

The stirring device according to the present invention is a stirring device for stirring molten glass, comprising a first stirred tank, a second stirred tank, and a connecting pipe. The first stirred tank has a first chamber, a first stirrer for stirring the molten glass in the first chamber, and a first discharge pipe capable of discharging the molten glass from the bottom of the first chamber. The second stirred tank has a second chamber, a second stirrer for stirring the molten glass in the second chamber, and a second discharge pipe capable of discharging the molten glass from the liquid level of the molten glass in the second chamber. The connecting pipe connects the upper lateral part of the first stirred tank to the upper lateral part of the second stirred tank. The connecting pipe transfers the molten glass from the first stirred tank to the second stirred tank via the connecting pipe. In the interior of the first stirred tank, the molten glass is stirred while being directed upward from below. In the interior of the second stirred tank, the molten glass stirred by the first stirrer is stirred while being directed downward from above.

Advantageous Effects of Invention

The method of manufacturing glass and the stirring device according to the present invention can stir molten glass in a more homogeneous manner.

BRIEF DESCRIPTION OF THE DRAWINGS

DESCRIPTION OF EMBODIMENTS (1) Overall Configuration of Glass Manufacturing Device An embodiment of a glass manufacturing device employing the method of manufacturing glass and the stirring device according to the present invention will be described with reference to the drawings. FIG. 1 is a generic view showing an example of a configuration of a glass manufacturing device 200 according to the present embodiment. The glass manufacturing device 200 is provided with a melting tank 40; a fining tank 41; a stirring device 100; a molding device 42; and conduits 43a, 43b, 43c connecting these. Molten glass MG produced in the melting tank 40 flows through the conduit 43a and into the fining tank 41; the MG having been fined in the fining tank 41 flows through the conduit 43b and into the stirring device 100; and the MG having been stirred homogeneously by the stirring device 100, flows through the conduit 43c and into the molding device 42, where a glass ribbon GR is molded from the molten glass MG by the molding device 42 employing a downdraw method.

Figure 1:
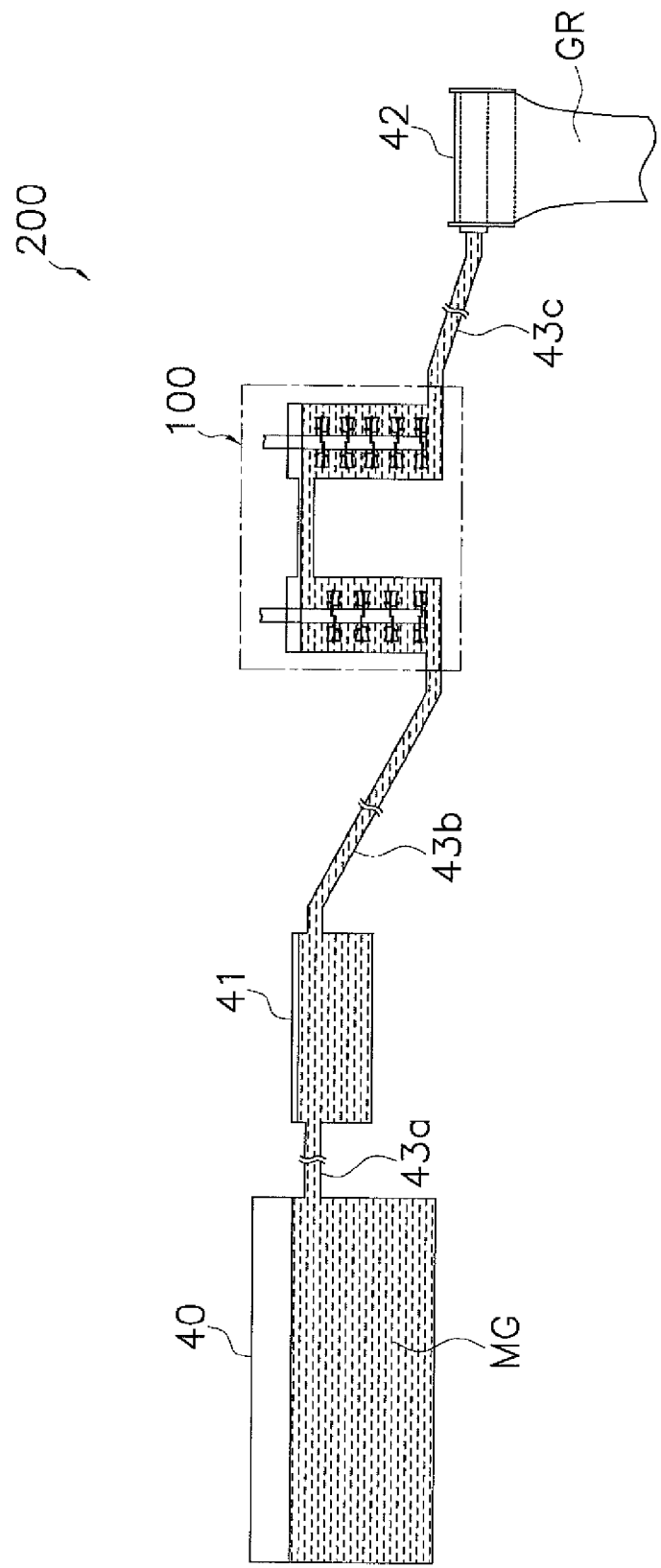
FIG. 1 is a schematic showing an example of a configuration of a glass manufacturing device according to an embodiment.

Heating means such as a burner or the like (not shown) is arranged in the melting tank 40, so that a glass material can be melted to obtain the molten glass MG. The glass material may be adjusted appropriately so that glass having the desired physical properties can be obtained. For example, the glass material may be prepared so as to obtain glass having substantially the following composition, expressed as mass percent.

$SiO_2$ 57-65%
$Al_2O_3$ 15-19%
$B_2O_3$ 8-13%
$MgO$ 1-3%
$CaO$ 4-7%
$SrO$ 1-4%
$BaO$ 0-2%
$Na_2O$ 0-1%
$K_2O$ 0-1%
$As_2O_3$ 0-1%
$Sb_2O_3$ 0-1%
$SnO_2$ 0-1%

$Fe_2O_3$ 0-1%
$ZrO_2$ 0-1%

Herein, "substantially" means that the presence of trace amounts of components within a range of less than 0.1 mass % is permissible. Consequently, it is permissible for the glass having the aforedescribed composition to have admixed therein trace amounts of other components, within a range of less than 0.1 mass %. The proportions of $Fe_2O_3$, $As_2O_3$, $Sb_2O_3$, and $SnO_2$ in the aforedescribed composition are values derived through conversion, treating all of the components Fe, As, Sb, or Sn having plural valence as $Fe_2O_3$, $As_2O_3$, $Sb_2O_3$, or $SnO_2$.

In the present embodiment, the glass material prepared in the aforedescribed manner is charged to the melting tank 40. In the melting tank 40, the glass material is melted at a temperature set according to the composition thereof, for example, 1500° C. or above, to obtain the molten glass MG.

The molten glass MG obtained in the melting tank 40 passes from the melting tank 40 through the conduit 43a and flows into the fining tank 41. Heating means (not shown) comparable to that of the melting tank 40 is arranged in the fining tank 41. The fining tank 41 further raises the temperature of the molten glass MG to bring about fining. In specific terms, in the fining tank 41, the temperature of the molten glass MG is raised to 1550° C. or above, and further to 1600° C. or above. Fining of the molten glass MG is brought about by the rise in temperature, removing tiny bubbles included in the molten glass MG.

The fined molten glass MG in the fining tank 41 passes from the fining tank 41 through the conduit 43b and flows into the stirring device 100. During passage through the conduit 43b, the molten glass MG cools down. In the stirring device 100, the molten glass MG is stirred and homogenized at a lower temperature than in the fining tank 41. In specific terms, in the stirring device 100, the molten glass MG is stirred while adjusted to within a temperature range of 1400° C.-1550° C. The viscosity of the molten glass MG stirred by the stirring device 100 is 450 poise-2400 poise.

The molten glass MG having been homogenized by the stirring device 100 passes from the stirring device 100 through the conduit 43c and flows into the molding device 42. During passage through the conduit 43c, the molten glass MG cools down again, cooling to a temperature of about 1200° C., suitable for molding. In the molding device 42, the molten glass MG is molded by the downdraw method. In specific terms, the molten glass MG flowing into the molding device 42 spills out over the top of the molding device 42 and flows downward along the side wall of the molding device 42. A glass ribbon GR is thereby continuously molded from the bottom edge of the molding device 42. The glass ribbon GR gradually cools as it moves downward, and finally is cut into plate glass of the desired size.

(2) Configuration of Stirring Device

Figure 2:
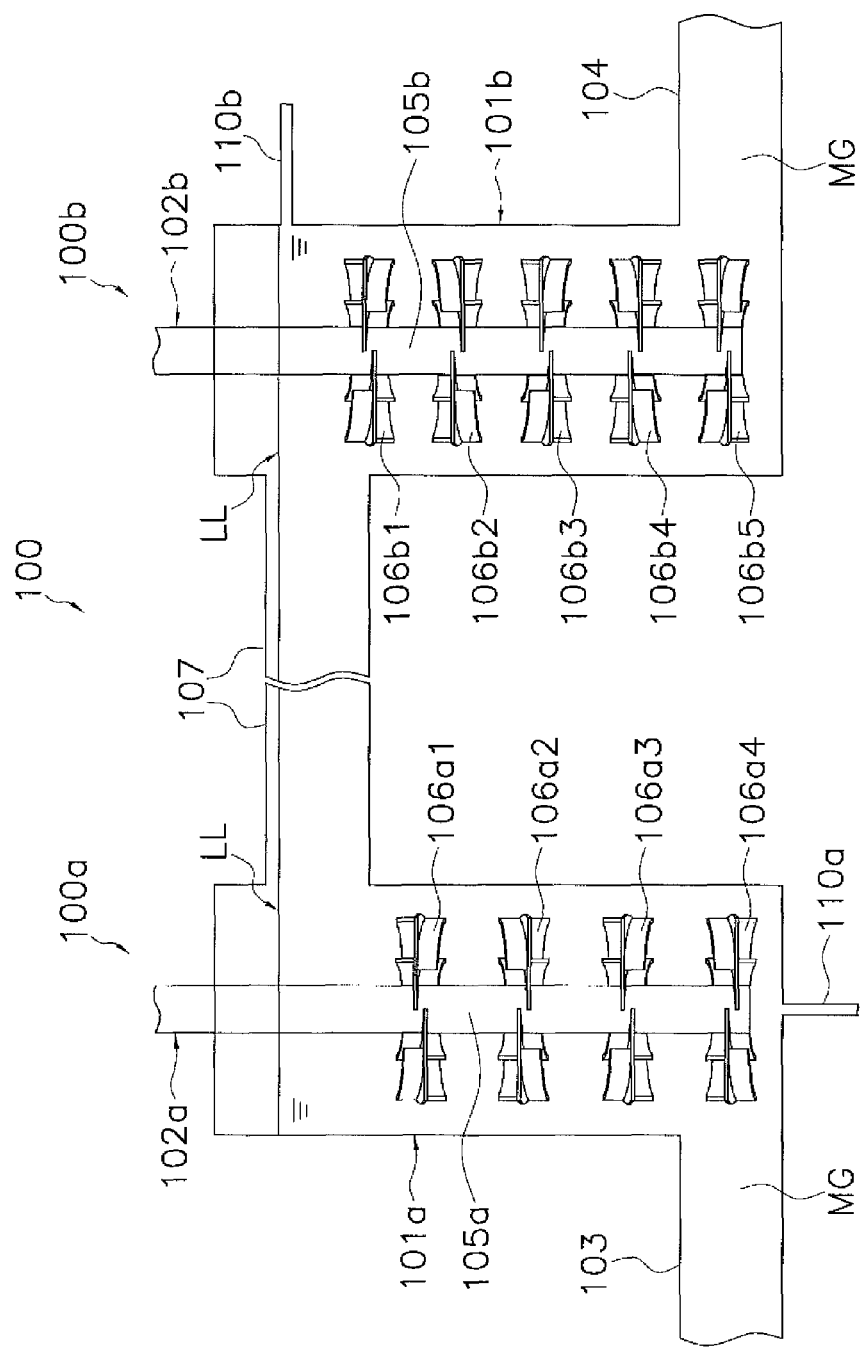
FIG. 2 is a side view of the stirring device according to the embodiment.
Figure 3:
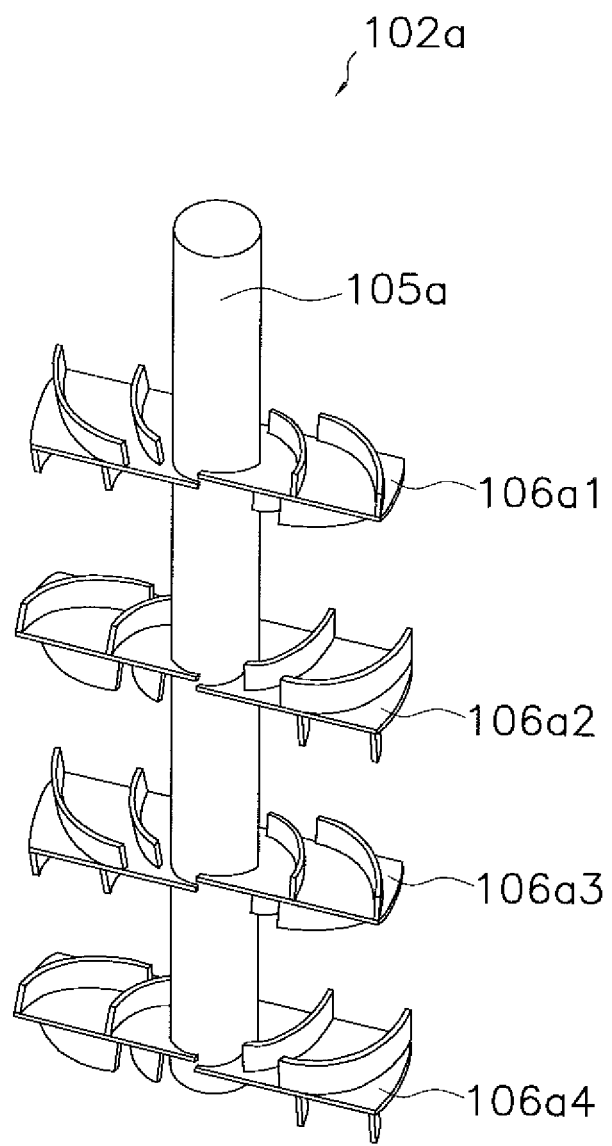
FIG. 3 is a perspective view of a first stirrer according to the embodiment.
Figure 4:
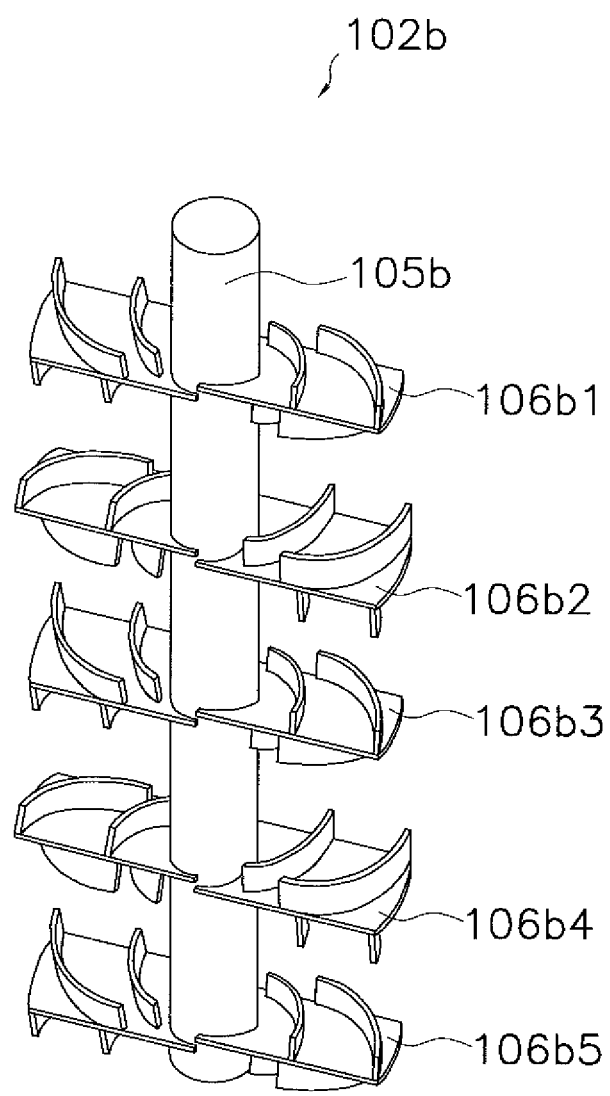
FIG. 4 is a perspective view of a second stirrer according to the embodiment.

FIG. 2 is a side view of the stirring device 100. The stirring device 100 is primarily constituted by a first stirred tank 100a and a second stirred tank 100b. The first stirred tank 100a is primarily constituted by a first chamber 101a, and a first stirrer 102a housed inside the first chamber 101a. The second stirred tank 100b is primarily constituted by a second chamber 101b, and a second stirrer 102b housed inside the second chamber 101b. FIG. 3 is a perspective view of the first stirrer 102a, and FIG. 4 is a perspective view of the second stirrer 102b.

The first chamber 101a and the second chamber 101b are both heat resistant receptacles of cylindrical shape having the same size. The first chamber 101a communicates with an upstream conduit 103 attached to the side wall at the bottom thereof, and with a connecting pipe 107 attached to the side wall at the top thereof. The second chamber 101b communicates with the connecting pipe 107 which is attached to the side wall at the top thereof, and with a downstream conduit 104 attached to the side wall at the bottom thereof. In FIG. 1, the conduit 43b corresponds to the upstream conduit 103, and the 43c corresponds to the downstream conduit 104. The upstream conduit 103 (conduit 43b) has a section that inclines downward towards the stirring device 100 from the fining tank 41. The downstream conduit 104 (conduit 43c) has a section that inclines downward towards the molding device 42 from the stirring device 100. The connecting pipe 107 is disposed on the horizontal.

The first chamber 101a communicates with a first discharge pipe 110a attached to the bottom face. The second chamber 101b communicates with a second discharge pipe 110b attached to the side wall at the top thereof. The second discharge pipe 110b is installed such that the upper edge of the opening of the side wall of the second chamber 101b is positioned above the liquid level LL of the molten glass MG, and the lower edge of the opening is positioned below the liquid level LL of the molten glass MG.

In the present embodiment, the first chamber 101a, the second chamber 101b, the first stirrer 102a, the second stirrer 102b, the upstream conduit 103, the downstream conduit 104, the connecting pipe 107, the first discharge pipe 110a, and the second discharge pipe 110b come into contact with the molten glass MG, and therefore are made of materials that can withstand the high temperature of the molten glass MG. For example, these members may be made of platinum, platinum alloy, iridium, iridium alloy, or the like. However, because platinum, platinum alloy, iridium, and iridium alloy are costly, it is preferable to minimize the amounts in which these are used. For example, the first chamber 101a and the second chamber 101b may have multilayer structures in which a platinum layer is formed only on the inner wall thereof.

In the first stirred tank 100a, the molten glass MG flows into the first chamber 101a in the lateral direction from the upstream conduit 103, and is stirred while being directed upward from below in the vertical direction within the first chamber 101a, then flows out in the horizontal direction from within the first chamber 101a to a connecting pipe 107. Then, in the second stirred tank 100b, the molten glass MG flows into the second chamber 101b from the connecting pipe 107 in the horizontal direction, and is stirred while being directed downward from above in the vertical direction within the second chamber 101b, and then flows out in the lateral direction from the second chamber 101b to the downstream conduit 104. The temperature of the molten glass MG within the first chamber 101a is preferably adjusted to be 40° C.-70° C. higher than the temperature of the molten glass MG in the second chamber 101b.

As shown in FIG. 3, the first stirrer 102a is provided with a first shaft 105a of axially rotating cylindrical post shape; and first blades 106a1, 106a2, 106a3, 106a4 connected to the side wall of the first shaft 105a. The first shaft 105a is disposed within the first chamber 101a with the rotation axis thereof lying along the perpendicular direction. The first shaft 105a is disposed with the rotation axis thereof aligned with the center axis of the cylindrical shape of the first chamber 101a. The first blades 106a1 to 106a4 are disposed, in that order, downward from above at equidistant spacing along the axial direction of the shaft 105a. Specifically, on the first stirrer 102a, the first blades 106a1 to 106a4 are disposed in four tiers along the axial direction of the first shaft 105a. The upper end of the first shaft 105a is linked to an external motor or the like, and the first stirrer 102a can rotate with the first shaft 105a as the rotation axis.

As shown in FIG. 4, the second stirrer 102b has a size and configuration comparable to the first stirrer 102a, and is provided with a second shaft 105b of axially rotating cylindrical post shape; and second blades 106b1, 106b2, 106b3, 106b4, 106b5 connected to the side wall of the second shaft 105b. Specifically, on the second stirrer 102b, the second blades 106b1 to 106b5 are disposed in five tiers along the axial direction of the second shaft 105b. The upper end of the second shaft 105b is linked to an external motor or the like, and the second stirrer 102b can rotate with the second shaft 105b as the rotation axis.

Figure 5:
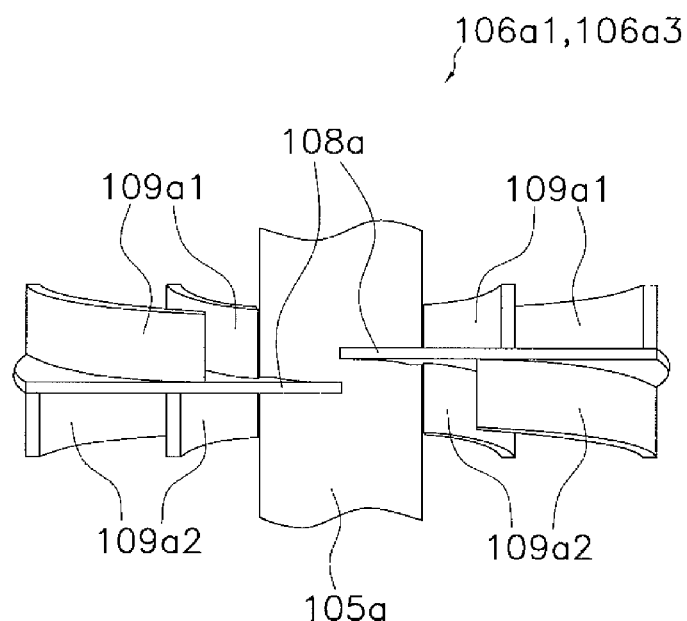
FIG. 5 is a side view of a first blade of the first stirrer according to the embodiment.
Figure 6:
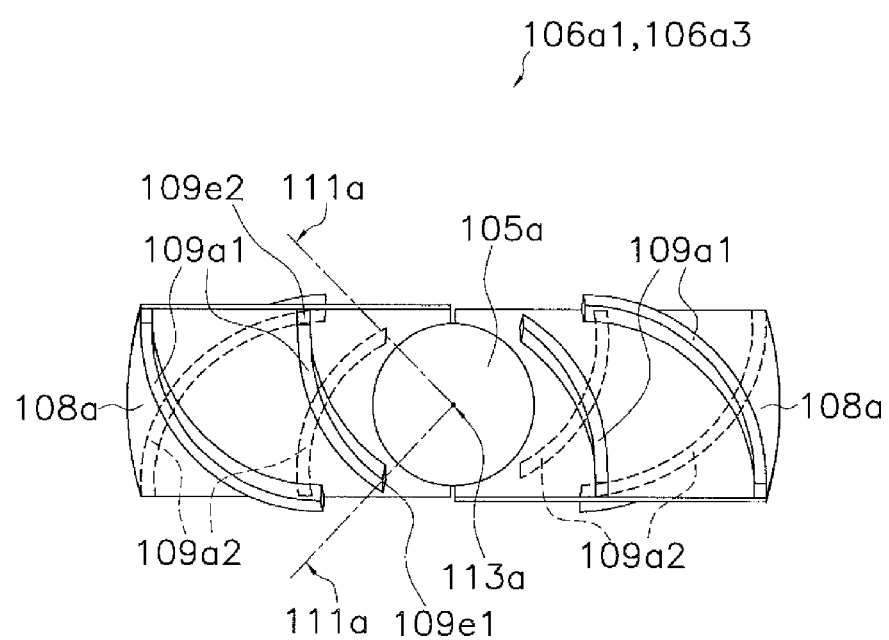
FIG. 6 is a plan view of a first blade of the first stirrer according to the embodiment.
Figure 7:
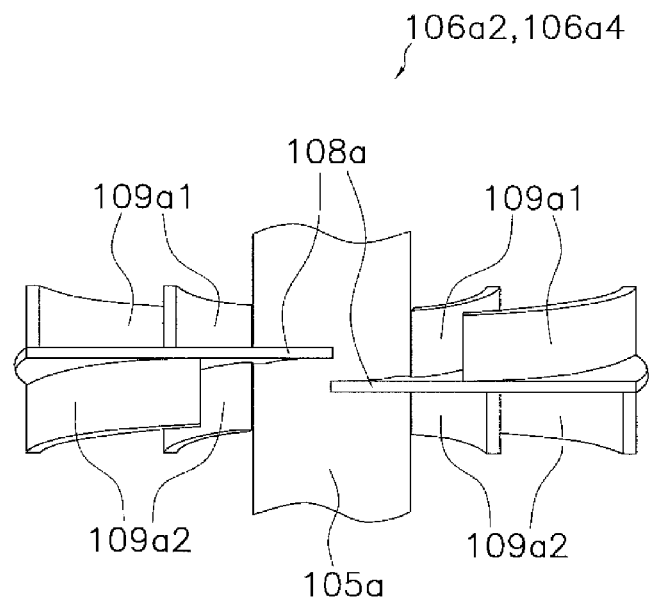
FIG. 7 is a side view of a first blade of the first stirrer according to the embodiment.
Figure 8:
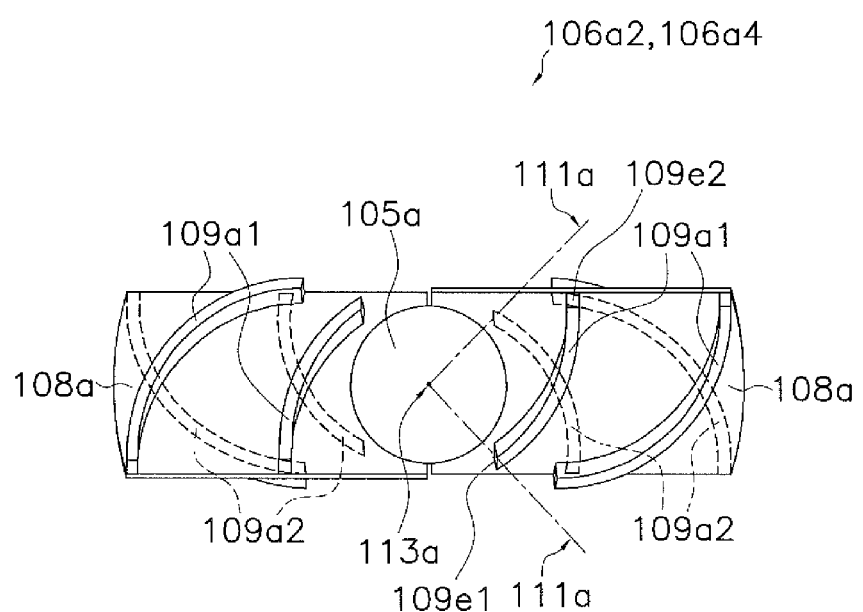
FIG. 8 is a plan view of a first blade of the first stirrer according to the embodiment.

Next, the configuration of the first blades 106a1 to 106a4 will be described while making reference to FIGS. 5 to 8. FIGS. 5 and 6 are respectively a side view and a plan view of the first blade 106a1, 106a3. FIGS. 7 and 8 are respectively a side view and a plan view of the first blade 106a2, 106a4. FIGS. 6 and 8 are plan views of the first blades 106a1 to 106a4 viewed from above along the rotation axis of the first shaft 105a. Each of the first blades 106a1 to 106a4 is composed of first support plates 108a directly connected to the first shaft 105a; first upper ancillary plates 109a1 arranged on the principal surface on the upper side of each first support plate 108a; and first lower ancillary plates 109a2 arranged on the principal surface on the lower side of each first support plate 108a. In the present embodiment, each of the first blades 106a1 to 106a4 has a configuration in which two support plates 108a are arranged perpendicular to the first shaft 105a, and two first upper ancillary plates 109a1 and two first lower ancillary plates 109a2 are respectively arranged on the principal surface on the upper side and the principal surface on the lower side of the support plates 108a. Herein, the first upper ancillary plates 109a1 and the first lower ancillary plates 109a2 are referred to collectively as the first ancillary plates. In the present embodiment, the first blades 106a1 and 106a3 have mutually identical shape, and the first blades 106a2 and 106a4 have mutually identical shape. The first blades 106a1, 106a3 differ from the first blades 106a2 and 106a4 in the disposition of the first support plates 108a and the first ancillary plates.

The two first support plates 108a are attached at mutually opposite positions centered about the rotation axis of the first shaft 105a. The first support plates 108a are oriented with the principal surfaces thereof inclined with respect to a plane perpendicular to the rotation axis of the first shaft 105a. For this reason, when the first stirrer 102a rotates about the first shaft 105a as the rotation axis, the molten glass MG flows along the principal surfaces of the first support plates 108a, thereby giving rise to an upward or downward flow in the molten glass MG. Specifically, through axial rotation of the first stirrer 102a, the first support plates 108a push the molten glass MG upward or push it downward. In the present embodiment, the first blades 106a1, 106a3 and the first blades 106a2, 106a4 differ in the direction of incline of the first support plates 108a. For this reason, the flows arising in the molten glass MG due to the first blades 106a1, 106a3 and the first blades 106a2, 106a4 differ in direction from one another.

The first ancillary plates are attached to the principal surface of the first support plate 108a in such a way that the principal surface thereof is approximately perpendicular to the principal surface of the first support plate 108a. The first upper ancillary plates 109a1 are attached to the principal surface on the upper side of the first support plate 108a, while the first lower ancillary plates 109a2 are attached to the principal surface on the lower side of the first support plate 108a. In FIGS. 6 and 8, the first lower ancillary plates 109a2 are shown by broken lines.

Each of the first ancillary plates has an inside edge 109e1 which is the edge on the side closest to the first shaft 105a, and an outside edge 109e2 which is the edge situated at the opposite side from the inside edge 109e1. As shown in FIGS. 6 and 8, the first ancillary plates are arranged such that, moving from the inside edge 109e1 towards the outside edge 109e2, the principal surfaces thereof diverge from a straight line 111a connecting the inside edge 109e1 and a center point 113a where the rotation axis of the first shaft 105a is positioned. In specific terms, as shown in FIG. 6, for the blades 106a1, 106a3, the first upper ancillary plates 109a1 are arranged such that the principal surfaces thereof diverge from the straight lines 111a in the clockwise direction, while the first lower ancillary plates 109a2 are arranged such that the principal surfaces thereof diverge from the straight lines 111a in the counterclockwise direction. On the other hand, as shown in FIG. 8, for the blades 106a2, 106a4, the first upper ancillary plates 109a1 are arranged such that the principal surfaces thereof diverge from the straight lines 111a in the counterclockwise direction, while the first lower ancillary plates 109a2 are arranged such that the principal surfaces thereof diverge from the straight lines 111a in the clockwise direction. Specifically, in each of the blades 106a1 to 106a4, the first upper ancillary plates 109a1 and the first lower ancillary plates 109a2 are arranged to extend in mutually opposite directions. Pairs of ancillary plates situated in opposition between two of the first blades 106a1 to 106a4 that are situated adjacently along the rotation axis of the first shaft 105a are arranged with the principal surfaces thereof diverging from the straight lines 111a, in the same direction as one another. For example, the first lower ancillary plates 109a2 of the first blade 106a1 positioned in the uppermost tier, and the first upper ancillary plates 109a1 of the first blade 106a2 positioned one tier below the first blade 106a1, are arranged such that the principal surfaces thereof diverge from the straight lines 111a in the counterclockwise direction.

The second blades 106b1 to 106b5 have configurations comparable to the first blades 106a1 to 106a4. Each of the second blades 106b1 to 106b5 is composed of two second support plates 108b directly connected to a second shaft 105b; two second upper ancillary plates 109b1 arranged on the principal surface on the upper side of each second support plate 108b; and two second lower ancillary plates 109b2 arranged on the principal surface on the lower side of each second support plate 108b. Herein, the second upper ancillary plates 109b1 and the second lower ancillary plates 109b2 are referred to collectively as the second ancillary plates. In the present embodiment, the second blades 106b1, 106b3, and 106b5 have mutually identical shape, and have a configuration identical to the configuration shown in FIGS. 5 and 6. The second blades 106b2, 106b4 have mutually identical shape, and have a configuration identical to the configuration shown in FIGS. 7 and 8. The second support plates 108b of the second blade 106b1 positioned in the uppermost tier are disposed at substantially the same heightwise position as the lower edge of the opening of the connecting pipe 107 in the side wall of the second chamber 101b.

(3) Operation of Stirring Device

Figure 9:
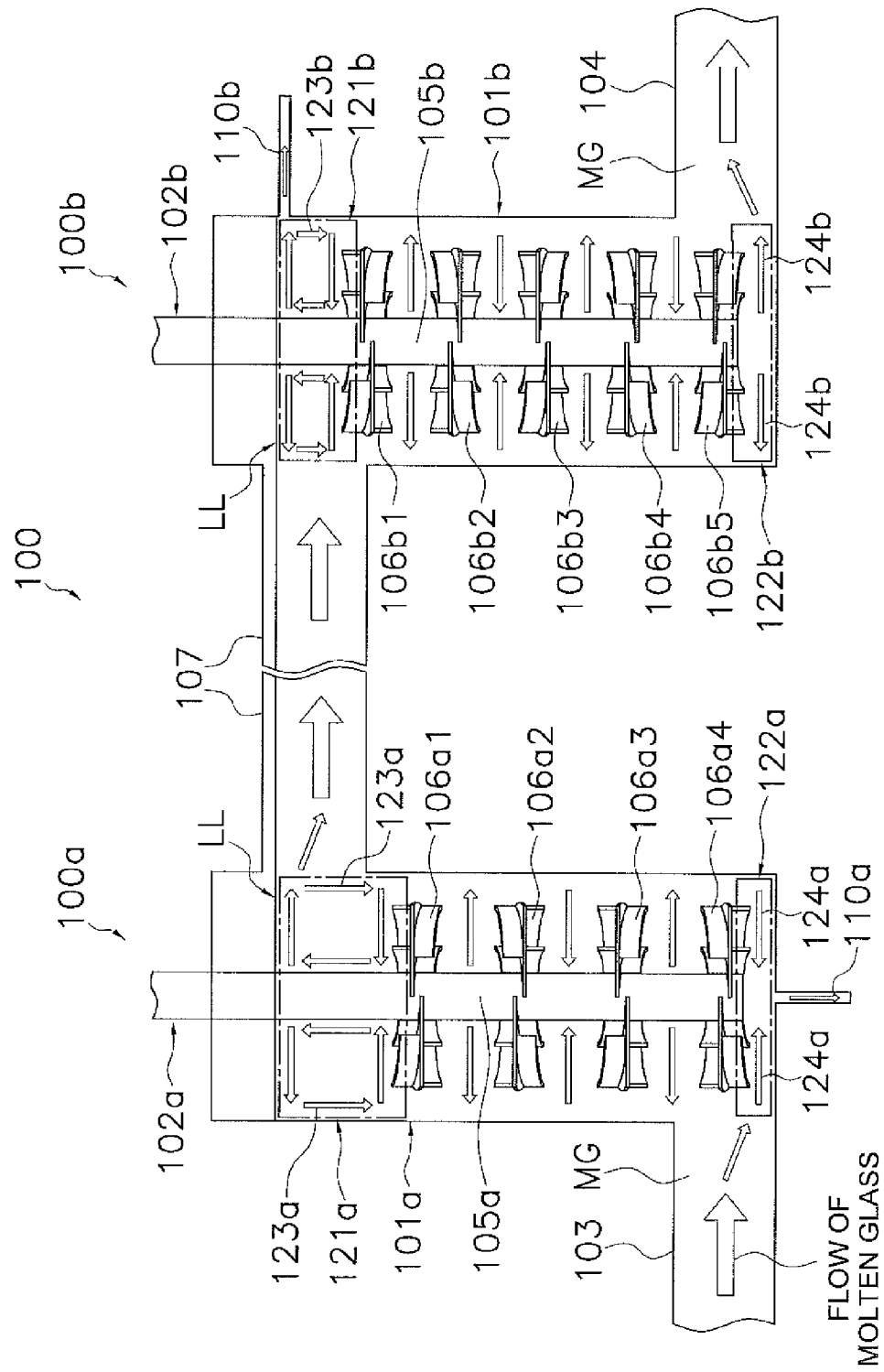
FIG. 9 is a diagram depicting flows of molten glass in the stirring device according to the embodiment.

The operation of the stirring device 100 according to the present embodiment is now described. FIG. 9 is a diagram depicting flows of molten glass MG in the stirring device 100. The molten glass MG having been fined in the fining tank 41 is stirred homogeneously through passage through the first stirred tank 100a and the second stirred tank 100b, and is fed to the molding device 42. In the stirring device 100, the molten glass MG fills the interior of the first chamber 101*a* of the first stirred tank 100*a*, and the interior of the second chamber 101*b* of the second stirred tank 100*b*, to a predetermined heightwise position. In the present embodiment, the liquid levels LL of the molten glass MG within the first chamber 101*a*, the connecting pipe 107, and the second chamber 101*b* are at substantially identical heightwise positions. Specifically, as shown in FIG. 9, the heightwise position of the liquid level LL of the molten glass MG is a position lower than the upper edge of the connecting pipe 107. For this reason, the spaces above the liquid level LL of the molten glass MG inside the first chamber 101*a* and the second chamber 101*b* communicate with one another via the connecting pipe 107.

(3-1) Flow of Molten Glass in the First Stirred Tank

The molten glass MG inflows in the lateral direction from the upstream conduit 103 and into the first chamber 101*a* of the first stirred tank 100*a*. Within the first chamber 101*a*, the molten glass MG is stirred by the first stirrer 102*a* while being directed upward from below. The stirred molten glass MG then outflows from within the first chamber 101*a* to the connecting pipe 107 in the horizontal direction.

Within the first chamber 101*a*, the molten glass MG is primarily stirred by rotation of the first blades 106*a*1 to 106*a*4 of the first stirrer 102*a*, about the first shaft 105*a* as the rotation axis. In specific terms, the first ancillary plates of the first blades 106*a*1 to 106*a*4 rake the molten glass MG from the inner wall of the first chamber 101*a* towards the first shaft 105*a*, or push it from the first shaft 105*a* towards the inner wall of the first chamber 101*a*. In the present embodiment, in each of the first blades 106*a*1 to 106*a*4, either the first upper ancillary plates 109*a*1 or the first lower ancillary plates 109*a*2 rake the molten glass MG from the inner wall of the first chamber 101*a* towards the first shaft 105*a*, while the others push the molten glass MG from the first shaft 105*a* towards the inner wall of the first chamber 101*a*. Specifically, above the first support plates 108*a* and below the first support plates 108*a* of each of the first blades 106*a*1 to 106*a*4, the molten glass MG flows in mutually opposite directions, in the radial direction of the first shaft 105*a*. For any two of the first blades 106*a*1 to 106*a*4 situated adjacently along the rotation axis of the first shaft 105*a*, the principal surfaces of the first lower ancillary plates 109*a*2 positioned in a tier above, and those of the first upper ancillary plates 109*a*1 positioned in the tier therebelow, diverge in the same direction from the straight lines 111*a*. For this reason, the flows of molten glass MG arising in the radial direction of the first shaft 105*a* due to a pair of mutually opposed ancillary plates 109*a* will move in the same direction.

In the present embodiment, through rotation of the first stirrer 102*a* in the clockwise direction as seen from above, the first upper ancillary plates 109*a*1 of the first blade 106*a*1 positioned in the uppermost tier of the first shaft 105*a* create a flow raking the molten glass MG from the inner wall of the first chamber 101*a* towards the first shaft 105*a*, as shown in FIG. 9. For this reason, the first lower ancillary plates 109*a*2 of the first blade 106*a*1, and the first upper ancillary plates 109*a*1 of the first blade 106*a*2 positioned one tier below, create a flow pushing the molten glass MG from the first shaft 105*a* towards the inner wall of the first chamber 101*a*. Likewise, the first lower ancillary plates 109*a*2 of the first blade 106*a*2, and the first upper ancillary plates 109*a*1 of the first blade 106*a*3, create a flow raking the molten glass MG from the inner wall of the first chamber 101*a* towards the first shaft 105*a*. The first lower ancillary plates 109*a*2 of the first blade 106*a*4 positioned in the lowermost tier then create a flow pushing the molten glass MG from the inner wall of the first chamber 101*a* towards the first shaft 105*a*. Specifically, in a lower space 122*a* between the first blade 106*a*4 positioned in the lowermost tier and the bottom face of the first chamber 101*a*, the molten glass MG flows in the direction shown by arrows 124*a* in FIG. 9. The flow direction shown by these arrows 124*a* is the direction of flow in which the molten glass MG is directed from the upstream conduit 103 to inside the first chamber 101*a*.

In the present embodiment, through axial rotation of the first stirrer 102*a*, the first upper ancillary plates 109*a*1 of the first blade 106*a*1 positioned in the uppermost tier create, above the support plates 108*a* of the first blade 106*a*1, a flow moving the molten glass MG from the inner wall of the first chamber 101*a* towards the first shaft 105*a*, and create a flow ascending the molten glass MG moved by this flow along the side wall of the first shaft 105*a*. The molten glass MG having ascended into proximity with the liquid level LL of the molten glass MG then flows from the first shaft 105*a* towards the inner wall of the first chamber 101*a*, and then further descends along the inner wall of the first chamber 101*a*. Specifically, in an upper space 121*a* between the first blade 106*a*1 positioned in the uppermost tier, and the liquid level LL of the molten glass MG, the molten glass MG forms a circulating flow 123*a* shown by FIG. 9. In proximity to the liquid level LL, the flow direction of the circulating flow 123*a* is a flow direction such that the molten glass MG is directed from within the first chamber 101*a* to the connecting pipe 107. Due to this circulating flow 123*a*, outflow of the molten glass MG to the connecting pipe 107 without passing through the upper space 121*a* is minimized, and stagnation of the molten glass MG without being stirred in the upper space 121*a* is minimized.

(3-2) Flow of Molten Glass in the Second Stirred Tank

Within the second chamber 101*b* of the second stirred tank 100*b*, the molten glass MG flows in from the connecting pipe 107 in the horizontal direction. Within the second chamber 101*b*, the molten glass MG is stirred by the second stirrer 102*b* while being directed downward from above. The stirred molten glass MG is then discharged from within the second chamber 101*b* to the downstream conduit 104 in the lateral direction.

The flows of the molten glass MG the second stirrer 102*b* creates within the second chamber 101*b* are basically the same as the flows of the molten glass MG the first stirrer 102*a* creates in the first chamber 101*a*. Specifically, above the second support plates 108*b* and below the second support plates 108*b* of each of the second blades 106*b*1 to 106*b*5, the flows of the molten glass MG in the radial direction of the second shaft 105*b* are in mutually opposite directions. The flows of the molten glass MG in the radial direction of the second shaft 105*b*, arising from the pairs of mutually opposed ancillary plates 109*b*, go in the same direction. However, whereas the first stirrer 102*a* has four tiers of the first blades 106*a*1 to 106*a*4, the second stirrer 120*b* has five tiers of the second blades 106*b*1 to 106*b*5.

In the present embodiment, through rotation of the second stirrer 102*b* in the clockwise direction as seen from above, the second upper ancillary plates 109*b*1 of the second blade 106*b*1 positioned in the uppermost tier of the second shaft 105*b* create a flow raking the molten glass MG from the inner wall of the second chamber 101*b* towards the second shaft 105*b*, as shown in FIG. 9. For this reason, the second lower ancillary plates 109*b*2 of the second blade 106*b*1, and the second upper ancillary plates 109*b*1 of the second blade 106*b*2 positioned one tier therebelow, create a flow pushing the molten glass MG from the second shaft 105*b* towards the inner wall of the second chamber 101b. Likewise, the second lower ancillary plates 109b2 of the second blade 106b2, and the second upper ancillary plates 109b1 of the second blade 106b3, create a flow raking the molten glass MG from the inner wall of the second chamber 101b towards the second shaft 105b. The second lower ancillary plates 109b2 of the second blade 106b5 positioned in the lowermost tier then create a flow pushing the molten glass MG from the second shaft 105b towards the inner wall of the second chamber 101b. Specifically, in a lower space 122b between the second blade 106b5 positioned in the lowermost tier and the bottom face of the chamber 101b, the molten glass MG flows in the direction shown by arrows 124b in FIG. 9. The flow direction shown by these arrows 124b is the direction in which the molten glass MG is directed from within the second chamber 101b into the downstream conduit 104. Stagnation of the molten glass MG without being stirred in the lower space 121b is minimized thereby.

In the present embodiment, through axial rotation of the second stirrer 102b, the second upper ancillary plates 109b1 of the second blade 106b1 positioned in the uppermost tier create, above the support plates 108b of the second blade 106b1, a flow moving the molten glass MG from the inner wall of the second chamber 101b towards the second shaft 105b, and create a flow ascending the molten glass MG moved by this flow along the side wall of the second shaft 105b. The molten glass MG having ascended into proximity with the liquid level LL of the molten glass MG then flows from the second shaft 105b towards the inner wall of the second chamber 101b, and then further descends along the inner wall of the second chamber 101b. Specifically, in an upper space 121b between the second blade 106b1 positioned in the uppermost tier, and the liquid level LL of the molten glass MG, the molten glass MG forms a circulating flow 123b shown by FIG. 9. In proximity to the second blade 106b1, the flow direction of the circulating flow 123b is a flow direction such that the molten glass MG is directed from the connecting pipe 107 to within the second chamber 101b. Due to this circulating flow 123b, stagnation of the molten glass MG without being stirred in the upper space 121b is minimized.

(4) Characteristics (4-1)

In the stirring device 100 according to the present embodiment, through axial rotation of the first stirrer 102a, between any two adjacent blades 106a1 to 106a4, the molten glass MG flowing from the upstream conduit 103 into the first chamber 101a of the first stirred tank 100a is raked from the inner wall of the first chamber 101a towards the first shaft 105a, or is pushed from the first shaft 105a towards the inner wall of the first chamber 101a. The flow direction of the molten glass MG in the radial direction of the first shaft 105a switches between opposite directions in each tier, moving upward from below inside the first chamber 101a. Specifically, the molten glass MG is effectively stirred by being moved in the radial direction of the first shaft 105a, while being directed progressively upward from below within the first chamber 101a.

Likewise, through axial rotation of the second stirrer 102b, the molten glass MG that has been stirred within the first chamber 101a and flowed from the connecting pipe 107 into the second chamber 101b of the second stirred tank 100b is effectively stirred by being moved in the radial direction of the second shaft 105b, while being directed progressively downward from above within the second chamber 101b.

Consequently, the stirring device 100 according to the present embodiment can stir the molten glass MG in a sufficiently homogeneous fashion through rotation of the first stirrer 102a and the second stirrer 102b, in the first stirred tank 100a and the second stirred tank 100b. For this reason, the glass manufacturing device 200 according to the present embodiment can minimize the occurrence of striae, and a high-quality glass product can be obtained.

(4-2)

As shown in FIG. 9, in the stirring device 100 according to the present embodiment, the first discharge pipe 110a is attached to the bottom face of the first chamber 101a of the first stirred tank 100a. The first discharge pipe 110a is employed to discharge the molten glass MG from the lower space 122a within the first chamber 101a.

Herein, it is conceivable that in some cases, components of high specific gravity included in the molten glass MG may accumulate in the lower space 122a of the first chamber 101a. Zirconia-rich molten glass, for example, is a component of high specific gravity included in the molten glass MG. Because the molten glass MG flows upward from below within the first chamber 101a, components of high specific gravity included in the molten glass MG do not readily flow into the second chamber 101b via the connecting pipe 107. For this reason, in the stirring device 100, components of high specific gravity included in the molten glass MG may accumulate in the lower space 122a at the bottom of the first chamber 101a in some cases. In such a case, the molten glass MG that includes the components of high specific gravity and that has accumulated at the bottom of the first chamber 101a may experience concentration of the high-specific gravity components over time, and come to include components of even higher specific gravity. When the molten glass MG including the components of high specific gravity is then supplied to the molding device 42, striae will occur in the molded glass article. In the present embodiment, the molten glass MG is stirred even at the bottom of the first chamber 101a, and therefore accumulation and concentration of molten glass MG including components of high specific gravity at the bottom of the first chamber 101a is minimized.

Additionally, because the first discharge pipe 110a is placed on the lower space 122a of the first chamber 101a, even if molten glass MG including components of high specific gravity which flows into the chamber 101a from the upstream conduit 103 should accumulate at the bottom of the first chamber 101a, the components of high specific gravity included in the molten glass MG can be removed via the first discharge pipe 110a.

Consequently, in the stirring device 100 according to the present embodiment, the molten glass MG can be stirred in sufficiently homogeneous fashion in the first stirred tank 100a. For this reason, the glass manufacturing device 200 according to the present embodiment can minimize the occurrence of striae, and a high-quality glass product can be obtained.

(4-3)

As shown in FIG. 9, in the stirring device 100 of the present embodiment, the second discharge pipe 110b is attached to the second stirred tank 100b at a heightwise position in proximity to the liquid level LL of the molten glass MG within the second chamber 101b. The second discharge pipe 110b is employed for discharging the molten glass MG from the liquid level LL of the molten glass MG within the second chamber 101b.

Herein, it is conceivable that in some cases, components of low specific gravity included in the molten glass MG may accumulate in proximity to the liquid level LL of the molten glass MG within the first chamber 101a, the second chamber 101b, and the connecting pipe 107. Silica-rich molten glass, and/or tiny air bubbles within the molten glass, and the like, for example, are components of low specific gravity included in the molten glass MG Due to the overall flow of the molten glass MG from the first chamber 101*a* towards the second chamber 101*b*, components of low specific gravity ultimately flow into the second chamber 101*b*. For this reason, the components of low specific gravity included in the molten glass MG can be removed, via the second discharge pipe 110*b*, from in proximity to the liquid level LL of the molten glass MG within the second chamber 101*b*. Within the second chamber 101*b*, the molten glass MG flows from the second shaft 105*b* towards the inner wall of the second chamber 101*b*, at a heightwise position in proximity to the liquid level LL of the molten glass MG For this reason, the molten glass MG within the second chamber 101*b* can readily flow into the second discharge pipe 110*b* which is arranged on the side wall of the second chamber 101*b*.

Consequently, in the stirring device 100 according to the present embodiment, the molten glass MG can be stirred in sufficiently homogeneous fashion in the second stirred tank 100*b*. For this reason, the glass manufacturing device 200 according to the present embodiment can minimize the occurrence of striae, and a high-quality glass product can be obtained.

(4-4)

In the stirred tank 100*a* of the stirring device 100 according to the present embodiment, the molten glass MG in the lower space 122*a* between the first blade 106*a*4 positioned in the lowermost tier of the first stirrer 102*a* and the bottom face of the first chamber 101*a* flows from the inner wall of the first chamber 101*a* towards the first shaft 105*a*, as shown by the arrows 124*a* in FIG. 9. This flow direction of the molten glass MG is a flow direction that accelerates inflow of the molten glass MG into the first chamber 101*a* from the upstream conduit 103. Between the first blade 106*a*4 and the first blade 106*a*3 which is positioned one tier above the first blade 106*a*4, the molten glass MG flows from the first shaft 105*a* towards the inner wall of the first chamber 101*a*. This flow direction of the molten glass MG is a flow direction that minimizes inflow of the molten glass MG into the first chamber 101*a* from the upstream conduit 103.

In the present embodiment, components of high specific gravity included in the molten glass MG supplied to the first stirred tank 100*a* inflow to the first chamber 101*a* along the bottom of the upstream conduit 103. Here, in a case in which the direction of flow of the molten glass MG in the lower space 122*a* of the first chamber 101*a* is the opposite direction from the arrows 124*a* in FIG. 9, specifically, in a case of a direction towards the inner wall of the first chamber 101*a* from the first shaft 105*a*, the components of high specific gravity flowing along the bottom of the upstream conduit 103 would hinder inflow to the first chamber 101*a*. As a result, the components of high specific gravity included in the molten glass MG would readily be retained at the bottom of the upstream conduit 103, just short of the first chamber 101*a*. In this case, there would be a risk that components of high specific gravity, having accumulated and concentrated at the bottom of the upstream conduit 103, would become entrained in the flow of the molten glass MG, and pass through the stirring device 100. This could cause striae to occur in the glass ribbon GR molded by the molding device 42.

In the present embodiment, the molten glass MG flowing through the upstream conduit 103 experiences accelerated inflow to the lower space 122*a* within the first chamber 101*a*, while inflow to the space between the first blade 106*a*4 positioned in the lowermost tier and the first blade 106*a*3 positioned one tier thereabove is minimized. For this reason, initially, the molten glass MG flowing through the upstream conduit 103 is supplied to the lower space 122*a* within the first chamber 101*a*, and is next stirred in succession by the first blades 106*a*4, 106*a*3, 106*a*2, and 106*a*1, and thereafter fed to the connecting pipe 107.

Consequently, in the stirring device 100 according to the present embodiment, the molten glass MG can be stirred in sufficiently homogeneous fashion in the first stirred tank 100*a*. For this reason, the glass manufacturing device 200 according to the present embodiment can minimize the occurrence of striae, and a high-quality glass product can be obtained.

(4-5)

In the second stirred tank 100*b* of the stirring device 100 according to the present embodiment, the molten glass MG in the lower space 122*b* between the second blade 106*b*5 positioned in the lowermost tier of the second stirrer 102*b* and the bottom face of the second chamber 101*b* flows from the second shaft 105*b* towards the inner wall of the second chamber 101*b*, as shown by the arrows 124*b* in FIG. 9. This flow direction of the molten glass MG is a flow direction that accelerates outflow of the molten glass MG into the downstream conduit 104 from within the second chamber 101*b*. Between the second blade 106*b*5 and the second blade 106*b*4 which is positioned one tier above the second blade 106*b*5, the molten glass MG flows from the inner wall of the second chamber 101*b* towards the second shaft 105*b*. This flow direction of the molten glass MG is a flow direction that minimizes outflow of the molten glass MG into the downstream conduit 104 from within the second chamber 101*b*.

In the present embodiment, the molten glass MG stirred by the second stirrer 102*b* and reaching the lower space 122*b* within the second chamber 101*b* experiences accelerated outflow to the downstream conduit 104. Meanwhile, outflow of the molten glass MG to the downstream conduit 104 from between the second blade 106*b*5 positioned in the lowermost tier and the second blade 106*b*4 positioned one tier thereabove is minimized. For this reason, instances in which insufficiently stirred molten glass MG flows out to the downstream conduit 104 from within the second chamber 101*b* are minimized.

Consequently, in the stirring device 100 according to the present embodiment, the molten glass MG can be stirred in sufficiently homogeneous fashion in the second stirred tank 100*b*. For this reason, the glass manufacturing device 200 according to the present embodiment can minimize the occurrence of striae, and a high-quality glass product can be obtained.

(4-6)

In the stirring device 100 according to the present embodiment, in the upper space 121*a* lying between the liquid level LL of the molten glass MG and the first blade 106*a*1 positioned in the uppermost tier within the first chamber 101*a* of the first stirred tank 100*a*, the molten glass MG forms an ascending flow at the perimeter of the first shaft 105*a*, while the molten glass MG forms a descending flow along the inner wall of the first chamber 101*a*. For this reason, outflow of the molten glass MG to the connecting pipe 107 without having passed through the upper space 121*a* is minimized, and stagnation of the molten glass MG without being stirred in the upper space 121*a* is minimized. Moreover, instances in which the molten glass MG forms a descending flow at the perimeter of the first shaft 105*a*, sucking the molten glass MG downward at the perimeter of the first shaft 105*a*, are minimized. For this reason, instances in which components of low specific gravity present on the liquid level LL of the molten glass MG or in proximity to the liquid level LL are sucked downward from the liquid level LL of the molten glass MG about the first shaft 105*a* are minimized.

As shown in FIG. 9, within the first chamber 101a, a circulating flow 123a of the molten glass MG is formed in the upper space 121a. For this reason, stagnation of the molten glass MG in proximity to the liquid level LL of the molten glass MG is minimized. In preferred practice, this circulating flow 123a has a speed such that ripples do not form on liquid level LL of the molten glass MG; or in more specific terms, a speed such that air in proximity to the liquid level LL is not entrained. The inventors have discovered that, for the purpose of forming an optimal circulating flow 123a for minimizing stagnation of the molten glass MC; the spacing between the first blade 106a1 and the liquid level LL of the molten glass MG is preferably from 50 mm to 200 mm; and moreover that the temperature of the molten glass MG in the upper space 121a is preferably from 1400° C. to 1550° C., and the viscosity is from 2400 to 450 Poise.

Consequently, in the stirring device 100 according to the present embodiment, the molten glass MG can be stirred in sufficiently homogeneous fashion in the first stirred tank 100a. For this reason, the glass manufacturing device 200 according to the present embodiment can minimize the occurrence of striae, and a high-quality glass product can be obtained.

(4-7)

In the stirring device 100 according to the present embodiment, in the upper space 121b lying between the liquid level LL of the molten glass MG and the second blade 106b1 positioned in the uppermost tier within the second chamber 101b of the second stirred tank 100b, the molten glass MG forms an ascending flow at the perimeter of the second shaft 105b, while the molten glass MG forms a descending flow along the inner wall of the second chamber 101b. For this reason, stagnation of the molten glass MG without being stirred in the upper space 121b is minimized. Moreover, instances in which the molten glass MG forms a descending flow at the perimeter of the second shaft 105b, sucking the molten glass MG downward at the perimeter of the second shaft 105b, are minimized. For this reason, instances in which components of low specific gravity present on the liquid level LL of the molten glass MG or in proximity to the liquid level LL are sucked downward from the liquid level LL of the molten glass MG about the second shaft 105b, resulting in outflow to the downstream conduit 104 without sufficient stirring, are minimized.

As shown in FIG. 9, within the second chamber 101b, a circulating flow 123b of the molten glass MG is formed in the upper space 121b. For this reason, stagnation of the molten glass MG in proximity to the liquid level LL of the molten glass MG is minimized. In preferred practice, this circulating flow 123b has a speed such that ripples do not form on liquid level LL of the molten glass MG. The inventors have discovered that, for the purpose of forming an optimal circulating flow 123b for minimizing stagnation of the molten glass MG, the spacing between the second blade 106b1 and the liquid level LL of the molten glass MG is preferably from 50 mm to 200 mm; and moreover that the temperature/viscosity of the molten glass MG in the upper space 121b is preferably from 2400 Poise/1400° C. to 450 Poise/1550° C.

Consequently, in the stirring device 100 according to the present embodiment, the molten glass MG can be stirred in sufficiently homogeneous fashion in the second stirred tank 100b. For this reason, the glass manufacturing device 200 according to the present embodiment can minimize the occurrence of striae, and a high-quality glass product can be obtained.

(5) MODIFICATION EXAMPLES (5-1) Modification Example A

In the present embodiment, in the first stirrer 102a, the first blades 106a1 to 106a4 are disposed in four tiers on the first shaft 105a; and in the second stirrer 102b, the second blades 106b1 to 106b5 are disposed in five tiers on the second shaft 105b. However, the number of tiers of the first blades 106a1 to 106a4 and the second blades 106b1 to 106b5 may be determined appropriately in consideration of the size of the first chamber 101a and the second chamber 101b, and/or the length of the first shaft 105a and the second shaft 105b, and so on, provided that the flow directions of the molten glass MG discussed previously are assured. Additionally, the spacing between two of the blades situated adjacently in the axial direction along the first shaft 105a and the second shaft 105b may be determined appropriately in consideration of the size of the first chamber 101a and the second chamber 101b, and so on.

(5-2) Modification Example B

Figure 10:
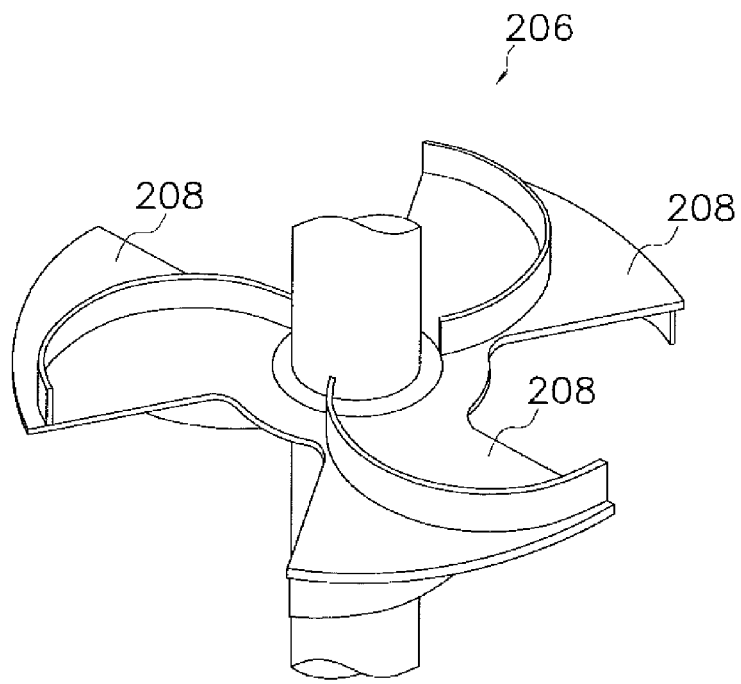
FIG. 10 is a perspective view of a first blade of a first stirrer according to a modification example B of the embodiment.

In the present embodiment, each of the first blades 106a1 to 106a4 is composed of two first support plates 108a, but could instead be composed of three or more first support plates 108a. Also, each of the second blades 106b1 to 106b5 is composed of two second support plates 108b, but could instead be composed of three or more second support plates 108b. As an example, FIG. 10 shows a perspective view of a first blade 206 having three first support plates 208. The present modification example is applicable to the second blades 106b1 to 106b5 of the second stirrer 102b as well.

(5-3) Modification Example C

Figure 11:
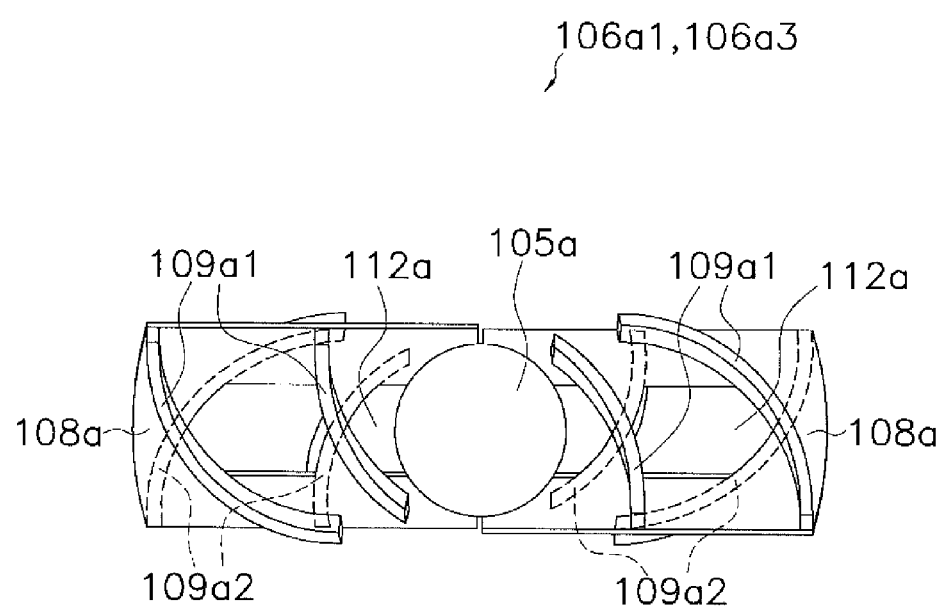
FIG. 11 is a plan view of a first blade of a first stirrer according to a modification example C of the embodiment.

In the present embodiment, the first stirrer 102a has the first blades 106a1 to 106a4. Through-holes 112a may be formed in the principal surfaces of the first support plates 108a of the first blades 106a1 to 106a4. FIG. 11 is a plan view of a first blade 106a1, 106a3 having through-holes 112a. In the present modification example, in a case in which the first stirrer 102a rotates about the first shaft 105a as the rotation axis, a portion of the molten glass MG can pass through the through-holes 112a. Passage of a portion of the molten glass MG through the through-holes 112a creates an upward or downward flow of the molten glass MG. As a result, in the molten glass MG within the first chamber 101a, the through-holes 112a create a flow in the axial direction of the first shaft 105a, in addition to the flow in the radial direction of the first shaft 105a produced by the first ancillary plates, and the flow in the axial direction of the first shaft 105a produced by inclination of the first support plates 108a. For this reason, within the first chamber 101a, more complex flows arise in the molten glass MG, and higher stirring effect can be obtained. Moreover, due to the through-holes 112a, the resistance the first blades 106a1 to 106a4 receive from the molten glass MG during rotation of the first stirrer 102a is lower, and less power is needed to create the intended flow in the molten glass MG. The present modification example is applicable to the second blades 106b1 to 106b5 of the second stirrer 102b as well.

(5-4) Modification Example D

In the present embodiment, the second discharge pipe 110b is positioned such that the upper edge of the opening of the side wall of the second chamber 101*b* is above the liquid level of the molten glass MG, and the lower edge of the opening is positioned below the liquid level of the molten glass MG. However, the second discharge pipe 110*b* may be arranged so that the liquid level of the molten glass MG is positioned above the upper edge of the opening of the side wall of the second chamber 101*b*. In specific terms, the second discharge pipe 110*b* may be arranged at a heightwise position such that components of low specific gravity present in proximity to the liquid level LL of the molten glass MG within the first chamber 101*a* can inflow to the second chamber 101*b* through the connecting pipe 107.

(5-5) Modification Example E

In the present embodiment, the molten glass MG employed in the glass manufacturing device 200 is alkali-free glass or low-alkali glass; and in the stirring device 100, the molten glass MG is stirred in a temperature range of 1400° C. to 1550° C. However, the molten glass MG employed in the glass manufacturing device 200 may be a molten glass to which a larger alkali component has been added, as compared with the molten glass MG used in the present embodiment. In this case, in the stirring device 100, the molten glass MG would be stirred in a temperature range of 1300° C. to 1400° C.

(5-6) Modification Example F

In the present embodiment, the first blades 106*a*1 to 106*a*4 are arranged such that the two first support plates 108*a* are orthogonal to the axial direction of the first shaft 105*a*. However, the first support plates 108*a* may be attached to the first shaft 105*a* in an inclined state with respect to a plane orthogonal to the first shaft 105*a*. The present modification example is applicable to the second blades 106*b*1 to 106*b*5 of the second stirrer 102*b* as well.

(5-7) Modification Example G

In the present embodiment, the first shaft 105*a* is disposed with the rotation axis thereof coincident with the center axis of the cylindrical shape of the first chamber 101*a*. However, the first shaft 105*a* is disposed with the rotation axis thereof away from the center axis of the cylindrical shape of the first chamber 101*a*.

(5-8) Modification Example H

In the present embodiment, the second stirrer 102*b* has the same size as the first stirrer 102*a*, but may have a different size than the first stirrer 102*a*. For example, the second stirrer 102*b* may have a smaller size than the first stirrer 102*a*.

Reference Signs List
40 Melting tank
41 Fining tank
42 Molding device
43*a*-43*c* Conduits
100 Stirring device
100*a* First stirred tank
100*b* Second stirred tank
101*a* First chamber
101*b* Second chamber
102*a* First stirrer
102*b* Second stirrer
103 Upstream conduit
104 Downstream conduit
105*a* First shaft
105*b* Second shaft
106*a*1-106*a*4 First blade
106*b*1-106*b*5 Second blade
107 Connecting pipe
108*a* First support plate
108*b* Second support plate
109*a*1 First upper ancillary plate
109*a*2 First lower ancillary plate
109*b*1 Second upper ancillary plate
109*b*2 Second lower ancillary plate
109*e*1 Inside edge
109*e*2 Outside edge
110*a* First discharge pipe
110*b* Second discharge pipe
111*a* Straight line
112*a* Through-hole
113*a* Center point
121*a*, 121*b* Upper space
122*a*, 122*b* Lower space
123*a*, 123*b* Circulating flows of molten glass
124*a*, 124*b* Molten glass flow
200 Glass manufacturing device
MG Molten glass
LL Liquid level
GR Glass ribbon
CITATION LIST
Patent Literature
(Patent Document 1) Japanese Unexamined Patent Application Publication 2001-72426
(Patent Document 2) Japanese Unexamined Patent Application Publication 2007-204357

The invention claimed is:
1. A method of manufacturing glass, comprising:
a melting step for melting a glass starting material and obtaining molten glass; a stirring step for stirring the molten glass obtained in the melting step; and a molding step for molding glass from the molten glass stirred in the stirring step; wherein in the method of manufacturing glass,
the stirring step comprises a first stirring step in which the molten glass is stirred while being directed upward from below in the interior of a first stirring tank, and a second stirring step in which the molten glass that was stirred in the first stirring step is stirred while being directed downward from above in the interior of a second stirring tank;
the first stirring tank is provided with a first chamber, a first stirrer for stirring the molten glass within the first chamber, and a first discharge pipe capable of discharging the molten glass from the bottom of the first chamber;
the second stirring tank is provided with a second chamber, an outflow port configured to allow the molten glass to flow from the bottom of the second chamber into a downstream conduit, a second stirrer for stirring the molten glass within the second chamber, and a second discharge pipe capable of discharging the molten glass from the liquid level of the molten glass within the second chamber;
the side of the first stirring tank in an upper part thereof is connected by a connecting pipe to the side of the second stirring tank in an upper part thereof; and
the molten glass is transferred from the first stirring tank to the second stirring tank via the connecting pipe.
2. The method of manufacturing glass as recited in claim 1, wherein the first stirrer has a first shaft constituting a rotation axis disposed along a vertical direction, and first blades connected to a side wall of the first shaft, and disposed in a plurality of tiers from an uppermost tier to a lowermost tier along the axial direction of the first shaft;

the first blades have first support plates furnished orthogonally with respect to the first shaft, and first ancillary plates arranged on principal faces of the first support plates;

the second stirrer has a second shaft constituting a rotation axis disposed along a vertical direction, and second blades connected to a side wall of the second shaft, and disposed in a plurality of tiers from an uppermost tier to a lowermost tier along the axial direction of the second shaft;

the second blades have second support plates furnished orthogonally with respect to the second shaft, and second ancillary plates arranged on principal faces of the second support plates;

in the first stirring step, the first stirrer rotates about the first shaft as the rotation axis, whereby the first ancillary plates creates, in the molten glass, a flow in the radial direction of the first shaft; and in the second stirring step, the second stirrer rotates about the second shaft as the rotation axis, whereby the second ancillary plates create, in the molten glass, a flow in the radial direction of the second shaft.

3. The method of manufacturing glass as recited in claim 2, wherein in the first stirring step, the first ancillary plates positioned between the first support plates of the first blades disposed in two adjacent tiers create a flow in the same direction in the molten glass; and in the second stirring step, the second ancillary plates positioned between the second support plates of the second blades disposed in two adjacent tiers create a flow in the same direction in the molten glass.

4. The method of manufacturing glass as recited in claim 3, wherein in the first stirring step, upward from the first support plates of the first blade positioned in the uppermost tier, the first ancillary plates arranged on the upper principal face of the first support plates of the first blade positioned in the uppermost tier create a first flow for moving the molten glass from an inner wall of the first chamber towards the first shaft, and create a second flow whereby the molten glass moved by the first flow ascends along a side face of the shaft; and in the second stirring step, upward from the second support plates of the second blade positioned in the uppermost tier, the second ancillary plates arranged on the upper principal face of the second support plates of the second blade positioned in the uppermost tier create a third flow for moving the molten glass from an inner wall of the second chamber towards the second shaft, and create a fourth flow whereby the molten glass moved by the third flow ascends along the side face of the shaft.

5. The method of manufacturing glass as recited in claim 4, wherein the first chamber has an inflow port situated in proximity to the heightwise position of the first blade positioned in the lowermost tier, the inflow port adapted for causing the molten glass to flow into the first chamber in the horizontal direction; and the second chamber has the outflow port situated in proximity to the heightwise position of the second blade positioned in the lowermost tier, the outflow port adapted causing the molten glass to flow out of the second chamber in the horizontal direction.

6. The method of manufacturing glass as recited in claim 4, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

7. The method of manufacturing glass as recited in claim 3, wherein the first chamber has an inflow port situated in proximity to the heightwise position of the first blade positioned in the lowermost tier, the inflow port adapted for causing the molten glass to flow into the first chamber in the horizontal direction; and the second chamber has the outflow port situated in proximity to the heightwise position of the second blade positioned in the lowermost tier, the outflow port adapted causing the molten glass to flow out of the second chamber in the horizontal direction.

8. The method of manufacturing glass as recited in claim 7, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

9. The method of manufacturing glass as recited in claim 3, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

10. The method of manufacturing glass as recited in claim 2, wherein in the first stirring step, upward from the first support plates of the first blade positioned in the uppermost tier, the first ancillary plates arranged on the upper principal face of the first support plates of the first blade positioned in the uppermost tier create a first flow for moving the molten glass from an inner wall of the first chamber towards the first shaft, and create a second flow whereby the molten glass moved by the first flow ascends along a side face of the shaft; and in the second stirring step, upward from the second support plates of the second blade positioned in the uppermost tier, the second ancillary plates arranged on the upper principal face of the second support plates of the second blade positioned in the uppermost tier create a third flow for moving the molten glass from an inner wall of the second chamber towards the second shaft, and create a fourth flow whereby the molten glass moved by the third flow ascends along the side face of the shaft.

11. The method of manufacturing glass as recited in claim 10, wherein the first chamber has an inflow port situated in proximity to the heightwise position of the first blade positioned in the lowermost tier, the inflow port adapted for causing the molten glass to flow into the first chamber in the horizontal direction; and the second chamber has the outflow port situated in proximity to the heightwise position of the second blade positioned in the lowermost tier, the outflow port adapted causing the molten glass to flow out of the second chamber in the horizontal direction.

12. The method of manufacturing glass as recited in claim 11, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

13. The method of manufacturing glass as recited in claim 10, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

14. The method of manufacturing glass as recited in claim 2, wherein the first chamber has an inflow port situated in proximity to the heightwise position of the first blade positioned in the lowermost tier, the inflow port adapted for causing the molten glass to flow into the first chamber in the horizontal direction; and the second chamber has the outflow port situated in proximity to the heightwise position of the second blade positioned in the lowermost tier, the outflow port adapted for causing the molten glass to flow out of the second chamber in the horizontal direction.

15. The method of manufacturing glass as recited in claim 14, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

16. The method of manufacturing glass as recited in claim 2, wherein in the first stirring step, the first stirrer rotates about the first shaft as the rotation axis, whereby, of the set of first ancillary plates arranged on the upper principal faces of the first support plates and the set of first ancillary plates arranged on the lower principal faces of the first support plate in the respective first blades, one set of the first ancillary plates create a flow of the molten glass from an inner wall of the first chamber towards the first shaft, while the other set of first ancillary plates creates a flow of the molten glass from the first shaft towards an inner wall of the first chamber;

in the second stirring step, the second stirrer rotates about the second shaft as the rotation axis, whereby, of the set of second ancillary plates arranged on the upper principal faces of the second support plates and the set of second ancillary plates arranged on the lower principal faces of the second support plate in the respective second blades, one set of the second ancillary plates creates a flow, in the molten glass, from the inner wall of the second chamber towards the second shaft, while the other set of second ancillary plates creates a flow, in the molten glass, from the second shaft towards the inner wall of the second chamber.

17. The method of manufacturing glass as recited in claim 16, wherein in the first stirring step, the first ancillary plates create, between the first blade positioned in the lowermost tier and the bottom face of the first chamber, a flow, in the molten glass, from the inner wall of the first chamber towards the first shaft; and between the first blade positioned in the lowermost tier and the first blade positioned one tier above the lowermost tier, a flow, in the molten glass, from the first shaft towards the inner wall of the first chamber; and in the second stirring step, the second ancillary plates create, between the second blade positioned in the lowermost tier and the bottom face of the second chamber, a flow, in the molten glass, from the second shaft towards the inner wall of the second chamber; and between the second blade positioned in the lowermost tier and the second blade positioned one tier above the lowermost tier, a flow, in the molten glass, from the inner wall of the second chamber toward the second shaft.

18. The method of manufacturing glass as recited in claim 2, wherein the first blades have a plurality of the first support plates connecting to the first shaft such that the normal to the principal faces thereof lies along the direction of extension of the first shaft, and have the first ancillary plates arranged on the upper principal faces and the lower principal faces of the respective first support plates; and the second blades have a plurality of the second support plates connecting to the first shaft such that the normal to the principal faces thereof lies along the direction of extension of the second shaft, and has the second ancillary plates arranged on the upper principal faces and the lower principal faces of the respective second support plates.

19. A method of manufacturing glass, comprising:

a melting step for melting a glass starting material and obtaining molten glass; a stirring step for stirring the molten glass obtained in the melting step; and a molding step for molding glass from the molten glass stirred in the stirring step; wherein in the method of manufacturing glass, the stirring step comprises a first stirring step for stirring the molten glass while the molten glass is directed upward from below in the interior of a first stirring tank, and a second stirring step for stirring the molten glass that was stirred in the first stirring step while the molten glass is directed downward from above in the interior of a second stirring tank;

the first stirring tank is provided with a first chamber, a first stirrer for stirring the molten glass within the first chamber, and a first discharge pipe capable of discharging the molten glass from the bottom of the first chamber;

the second stirring tank is provided with a second chamber, an outflow port configured to allow the molten glass to flow from the bottom of the second chamber into a downstream conduit, a second stirrer for stirring the molten glass within the second chamber, and a second discharge pipe capable of discharging the molten glass from the liquid level of the molten glass within the second chamber;

the side of the first stirring tank in an upper part thereof is connected by a connecting pipe to a side of the second stirring tank in the upper part thereof;

the molten glass is transferred from the first stirring tank to the second stirring tank via the connecting pipe;

in the second stirring step, the second stirrer rotates about a second shaft as a rotation axis, whereby second ancillary plates create, in the molten glass, a flow in the radial direction of the second shaft, and the second ancillary plates positioned between second support plates of second blades disposed in two adjacent tiers create, in the molten glass, a flow in the same direction; and in the second stirring step, upward from the second support plates of the second blade positioned in an uppermost tier, the second ancillary plates arranged on the upper principal face of the second support plates of the second blade positioned in the uppermost tier create a first flow for moving the molten glass towards the second shaft from an inner wall of the second chamber, and create a second flow for causing the molten glass moved by the first flow to ascend along a side face of the shaft.

* * * * *

UNITED STATES PATENT AND TRADEMARK OFFICE
CERTIFICATE OF CORRECTION

PATENT NO. : 8,616,025 B2
APPLICATION NO. : 13/610774
DATED : December 31, 2013
INVENTOR(S) : Kohei Yamamoto et al.

Page 1 of 1

It is certified that error appears in the above-identified patent and that said Letters Patent is hereby corrected as shown below:

In the Claims

Please correct claim 17 as follows 17. (previously presented): The method of manufacturing glass as recited in claim 16 ~~claim 6~~, wherein
in the first stirring step, the first ancillary plates create, between the first blade positioned in the lowermost tier and the bottom face of the first chamber, a flow, in the molten glass, from the inner wall of the first chamber towards the first shaft; and between the first blade positioned in the lowermost tier and the first blade positioned one tier above the lowermost tier, a flow, in the molten glass, from the first shaft towards the inner wall of the first chamber; ...

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,616,025 B2
APPLICATION NO. : 13/610774
DATED : December 31, 2013
INVENTOR(S) : Kohei Yamamoto et al.

Page 1 of 1

It is certified that error appears in the above-identified patent and that said Letters Patent is hereby corrected as shown below:

In the Claims

Column 23, lines 36-44, please correct claim 17 as follows 17. (previously presented): The method of manufacturing glass as recited in claim 16 ~~claim 6~~, wherein in the first stirring step, the first ancillary plates create, between the first blade positioned in the lowermost tier and the bottom face of the first chamber, a flow, in the molten glass, from the inner wall of the first chamber towards the first shaft; and between the first blade positioned in the lowermost tier and the first blade positioned one tier above the lowermost tier, a flow, in the molten glass, from the first shaft towards the inner wall of the first chamber; ...

This certificate supersedes the Certificate of Correction issued May 6, 2014.

Signed and Sealed this
Third Day of June, 2014

Michelle K. Lee
*Deputy Director of the United States Patent and Trademark Office*